(12) United States Patent
Harrison et al.

(10) Patent No.: US 9,444,790 B2
(45) Date of Patent: Sep. 13, 2016

(54) METHOD AND APPARATUS FOR THREAT ISOLATION AND REMOTE RESOLUTION FOR COMPUTER SYSTEMS

(71) Applicant: International Business Machines Corporation, Armonk, NY (US)

(72) Inventors: Justin L. Harrison, Delaware, OH (US); Dustin M. Mann, Worthington, OH (US); Liviu Rodean, Hilliard, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 14/572,875

(22) Filed: Dec. 17, 2014

(65) Prior Publication Data

US 2016/0182455 A1 Jun. 23, 2016

(51) Int. Cl.
*H04L 29/06* (2006.01)
*H04L 29/08* (2006.01)

(52) U.S. Cl.
CPC ......... *H04L 63/0272* (2013.01); *H04L 63/145* (2013.01); *H04L 67/10* (2013.01)

(58) Field of Classification Search
CPC .................................................. H04L 63/0272
USPC ......................................................... 726/15
See application file for complete search history.

(56) References Cited

U.S. PATENT DOCUMENTS

| 8,488,618 B1* | 7/2013 | Mittal | H04L 63/02 370/401 |
| 8,520,512 B2* | 8/2013 | Gilde | H04L 63/0227 370/230 |
| 2013/0091534 A1 | 4/2013 | Gilde et al. | |
| 2013/0219457 A1 | 8/2013 | Touboul | |
| 2013/0305368 A1 | 11/2013 | Ford | |
| 2014/0298008 A1* | 10/2014 | Hulick | H04L 63/0209 713/155 |

FOREIGN PATENT DOCUMENTS

EP 2400699 A1 12/2011

OTHER PUBLICATIONS iTwinn.com, "End-to-End Encrypted Remote Network and File Access", Accessed Oct. 24, 2014, pp. 1-2.

\* cited by examiner

*Primary Examiner* — Longbit Chai
(74) *Attorney, Agent, or Firm* — William Stock; Michael A. Petrocelli (57) ABSTRACT

A method and system providing remote access for threat removal to a computer system. A remote virtual private network (VPN) connection is established to an application on a remote computer utilizing a plug and play communications device having a trusted embedded component. The plug and play communications device is connectable to a first computer. Access is allowed to the first computer by the application on the remote computer using the VPN to perform threat removal operations on the first computer.

19 Claims, 6 Drawing Sheets

METHOD AND APPARATUS FOR THREAT ISOLATION AND REMOTE RESOLUTION FOR COMPUTER SYSTEMS

BACKGROUND

Client computers on a network can be vulnerable and a target of a software-based threat, for example, malware (malicious code), such as a virus, Trojan, or a worm threat. When an infected device or computer is discovered on a network, one technique is to disconnect the device/computer from the network, or quarantine the computer within the network in order to prevent the spread of the threat among other machines present on the network. However, if the infected computer's administrative and IT (information technology) tasks are performed remotely within the organization or, for example, by a third party over a network connection, the remote administrator may be unable to perform the necessary recovery steps on the client computer due to its removal from the network.

SUMMARY

According to an aspect of the invention, a method provides remote access for threat removal to a computer system. The method establishes a remote virtual private network (VPN) connection to an application on a remote computer utilizing a plug and play communications device having a trusted embedded component and being connectable to a first computer. The method allowing access to the first computer by the application on the remote computer using the VPN to perform threat removal operations on the first computer.

According to another aspect of the invention, a system provides remote access for threat removal to a computer system. A plug and play communications device includes a trusted embedded component and is connectable to a first computer for establishing a remote virtual private network (VPN) connection to an application on a remote computer. The remote computer is allowed access to the first computer by the application on the remote computer to perform threat removal operations on the first computer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
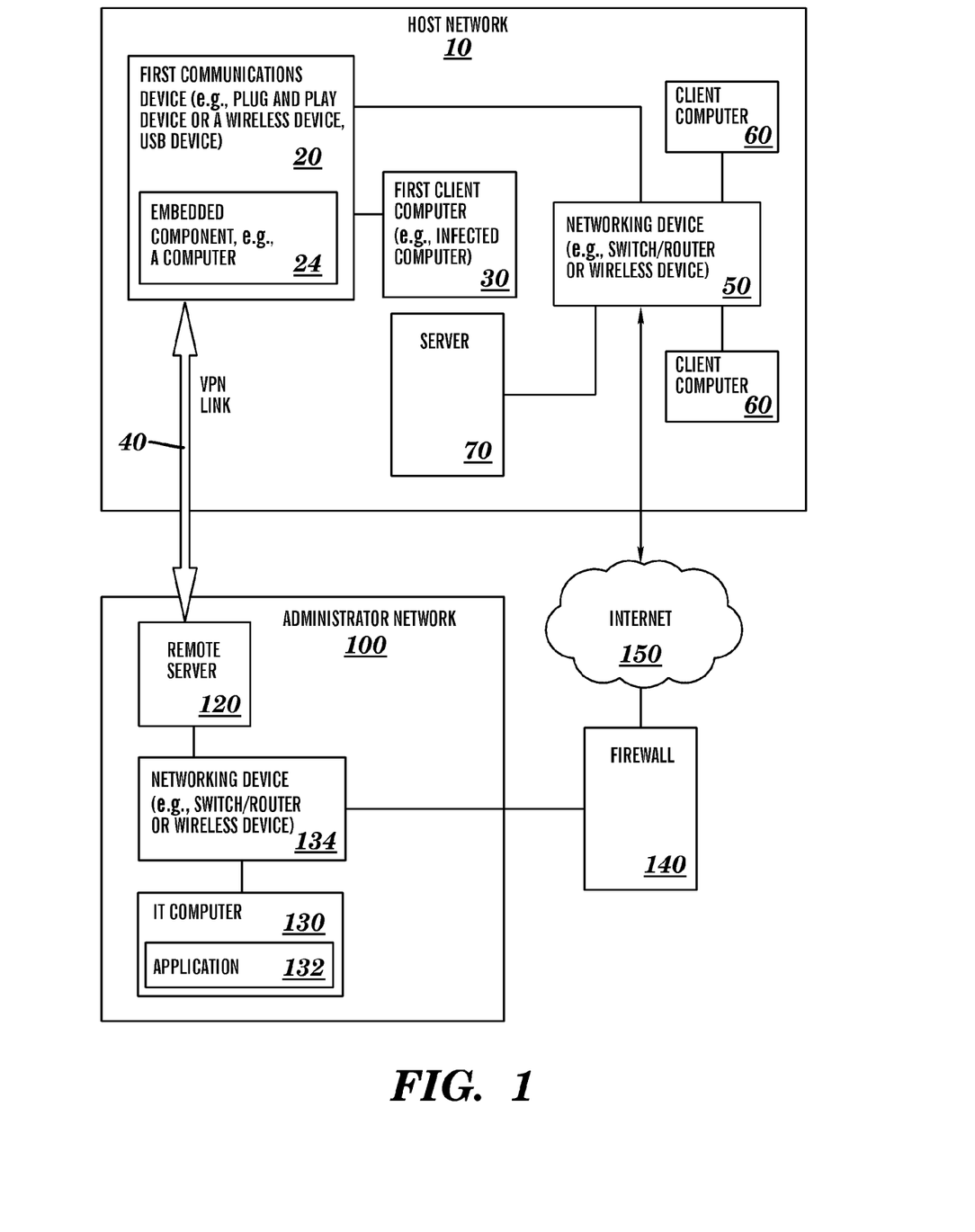
FIG. 1 is a schematic block diagram illustrating an overview of a system and methodology for providing remote access for threat removal from a computer according to an embodiment of the disclosure.

Referring to FIG. 1, an embodiment according to the present disclosure can include a communications component of a client computer, for example, a first communications device 20 connectable to a first computer or a first client computer 30. When the first client computer 30 is infected with a virus, the first device can be connected to the first client computer. The first communications device 20 can include a USB (Universal Serial Bus) device which can be connected to the first client computer through a USB port of the infected first client computer 30. The first client computer 30 is also connected to a host network 10. The host network 10 can include a server which can be a domain/file server 70 which communicates with the internet 150 and other client computers 60 via a router or a combination of a switch and router generically illustrated in FIG. 1 as a networking device 50. If the client computer is infected with a virus or malware (such as a Trojan, or a worm threat), the method and system of the present disclosure provides a technique for quarantining the infected client computer from the host network 10.

A second component, for example, an IT computer 130 on a remote administrator network 100 can be an administrative server on another network other than the host network 10 and isolated from its critical systems. The IT computer 130 can be connected to a remote server 120 located at the site of a remote administrator or IT professional who can remove the threat or perform data recovery on the first client computer 30 using the IT computer 130. The IT computer 130 can be connected to a networking device 134 which provides access to the remote server 120, and connectivity to the Internet 150 through a firewall 140.

The USB device (as an embodiment of the first device) 20 can establish a Virtual Private Network (VPN) connection with the remote server 120 and thereby the IT computer 130 upon connection of the USB device to the first client computer 30 and the network 100. The USB device can deny access to any device not within the VPN, quarantining the threat to within the VPN while allowing the remote administrator or IT professional at the IT computer 130 to perform proper threat removal and data recovery on the infected first client computer 30. A prior configuration of the network to which the infected client computer was formerly connected is not needed. Further, the above described embodiment of the present disclosure using the first device does not rely on a software configuration of the infected client computer to be trusted.

Figure 2:
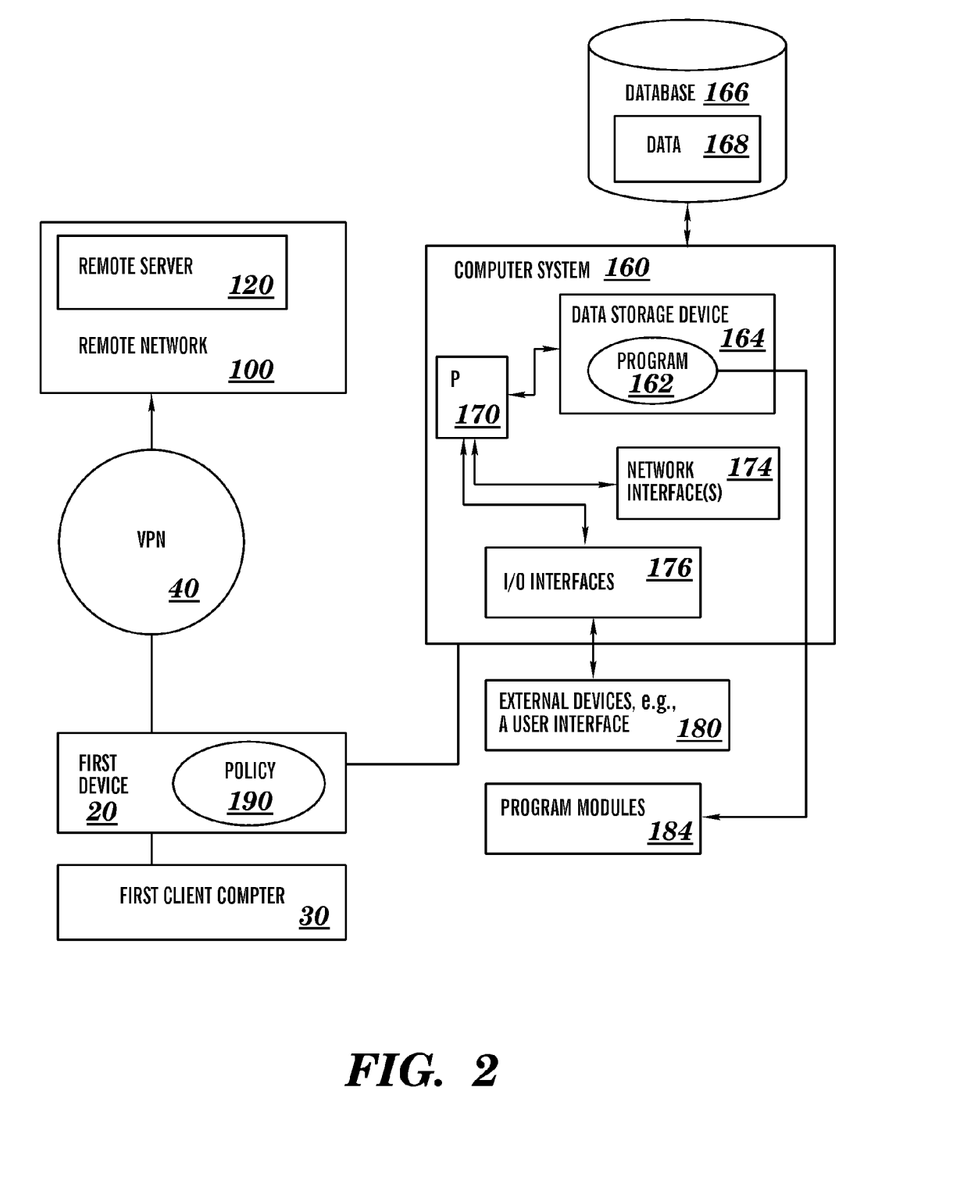
FIG. 2 is a functional block diagram illustrating a embodiment according to the present disclosure based on FIG. 1.

Referring to FIGS. 1 and 2 depicting the first device 20, in one embodiment, can be embodied as a hardware dongle with a USB male plug for connecting to the first client computer 30. When connected, the hardware dongle masquerades as a USB networking card. The first device 20 can also include an embedded component 24 such as a computer. In one embodiment, the embedded component 24 can include, for example, an IEEE (Institute of Electrical and Electronics Engineers) 802.11 b/g/n capable radio and antenna, and a computer 24 that establishes the VPN connection 40 to the remote server 120 and enforces a specific network policy 190 (shown in FIG. 2) such that all communications through the virtual networking card are forced through the VPN connection 40. Software and configuration of the hardware dongle can digitally sign against tampering and be read-only unless it is put into an administrative configuration mode to enable an initial setup.

The remote server 120 can run a VPN server software configured to only accept connections from the first device (e.g., USB device) 20 and the administrative staff or IT professional's computer 130. The IT computer 130 can include an application 132 for an IT professional to use for threat removal and data recovery on the first client computer 30 via the VPN 40. The remote server 120 can be firewalled 140 from any critical network infrastructure.

In one example, in order to both quarantine the infected first client computer 30 from other devices on the host network 10 and enable the remote administrative staff or IT professionals to perform threat removal or data recovery at the administrator network 100, the client computer's 30 built-in networking interfaces can be disabled or disconnected. Then, the USB device 20 can be inserted into the client computer and connect to the network that the client computer was formerly connected to, for example, in the embodiment shown in FIG. 1, the host network 10. The VPN connection/link 40 can be automatically established with the remote server 120, enabling the administrative staff or IT professionals using IT computer 130 to participate in the administrator network 100 in order to perform remote threat removal and data recovery tasks on the workstation/first client computer 30.

The first communications device 20 can be connected to the infected first client computer 30 and can also be connected to the host network 10 in a variety of ways. The first communications device can be embodied as a device connected to the client computer through an Ethernet patch cable and act as a virtual networking gateway instead of a networking card. Another embodiment of the first communications device includes connecting to the host network through an Ethernet connection instead of an IEEE 802.11 b/g/n wireless connection.

In one embodiment, the USB device 20 can include two connectors, one to connect it to a workstation via a USB port such as the first client computer 30, and another connector to connect it to a network (such as an IEEE 802.11 b/g/n radio and antenna).

In another embodiment the USB device 20 can include an embedded computer 24 having an operating system that establishes a VPN connection, and digitally signed configuration data that describes how it should connect to the VPN server. When the USB device 20 is connected to a workstation, it presents itself as a USB-based network interface. Upon connection to the network, it establishes a VPN connection with the remote server 120.

A computer/computer system 160 is a generic embodiment of a computer. The embedded component 24 can include all or part, or variations of, the computer system 160. A program 162 embodied on a computer readable storage device, e.g., data storage device 164 which is executable by a processor 170 of the computer 160 (i.e., execute program steps, code, or program code). Data storage may also be embodied as a database 166 and data 168. The program or executable instructions therefrom, may be offered as a service by a provider. The computer 160 and program 162 shown in FIG. 2 are generic representations of a computer and program that may be local to a user, or provided as a remote service, such as a website accessible using a network (e.g., the Internet or cloud services). It is understood that the computer 160 also generically represent herein a computer device such as one or more servers, alone or as part of a datacenter. The computer system 160 can include a network interface 174, and input/output (I/O) interface(s) 176. The I/O interface 176 allows for input and output of data with an external device 180 that may be connected to the computer system 160. The network interface 174 may provide communications between the computing device and a computer network. A method and system components and techniques may be embodied in modules of the program 162 for performing the tasks of each of the steps of a method and system, such modules are generically represented in FIG. 2 as program modules 184. The program 162 and program modules 184 can execute specific steps, routines, sub-routines, instructions or code, of the program.

In one embodiment, the remote server 120 can run an operating system and VPN server software. The remote server can be hardened to prevent modification by any other device on the VPN.

In another embodiment, the remote server 120 can accept or deny VPN connection requests from multiple USB components, and can cut off or reestablish connections while the USB device 20 is plugged into a workstation/client computer 30.

In a further embodiment according to the present disclosure, the VPN can be established using a cloud based environment. For example, the remote server can be cloud based.

IT staff or administrative staff can be connected to the same physical network as the remote server, depicted as the administrator network 100 shown in FIG. 1. The remote server 120 can perform administrative tasks on the device/computer connected to the first device 20, such as data recovery or threat removal.

In one embodiment of the present disclosure, IT support can be administered by an off-premises contractor having an administrator network 100 for a company having the host network 10. A remote IT administrator can use remote session management software to perform IT support on the company's workstations, for example, the first client computer 30 shown in FIG. 1. The off-premises contractor can configure an instance of a USB device and deliver it to the company to keep on premises in case of emergency. The contractor can have a remote server 120 on a network 100 on their premises, kept separate from all other mission-critical devices.

In another embodiment, a workstation/first client computer 30 at a company can be a target of a spear phishing attack, and can succumb to a worm infection targeted at the company's network architecture. The workstation can include mission-critical data that needs to be recovered. The company may use a contractor or remote service having an administrator network 100 which can instruct the workstation on a host network 10 to be disconnected from the company's network infrastructure, to prevent the threat from spreading to other machines in the host network or harming files on a file server. A USB component/device 20 can be connected to a USB port on the workstation 30. The USB device 20 can connect to the administrator network 100 via a wireless network which can include the first device 20 communicating with the administrator network 100 via the networking device 50, the Internet 150, through the firewall 140 and to a remote networking device 134, which is connected to the remote server 120 of the administrator network 100.

The USB component 20 can establish a VPN connection to the remote server 120 over the internet. The USB component 20 can block all communications from the workstation 30 that are destined for any machine not on the VPN 40. The IT computer 130 using the remote server and the VPN 40 can be used to perform threat analysis, data recovery, and threat removal from the infected workstation 30 through remote session management software. The host network thereby can retain mission-critical data from the infected machine using the administrator network 100 without sending a technician on site (to the host network).

Thereby, the present disclosure includes a method and system that can quarantine an infected device from a network, and which allows for remote administration through a VPN connection to a remote administration device for threat removal.

The present disclosure can include a hardware dongle with the network restrictions embedded within the hardware device itself. As such, it can perform proper quarantining of an endpoint (e.g., device or computer) regardless of its software state.

Figure 3:
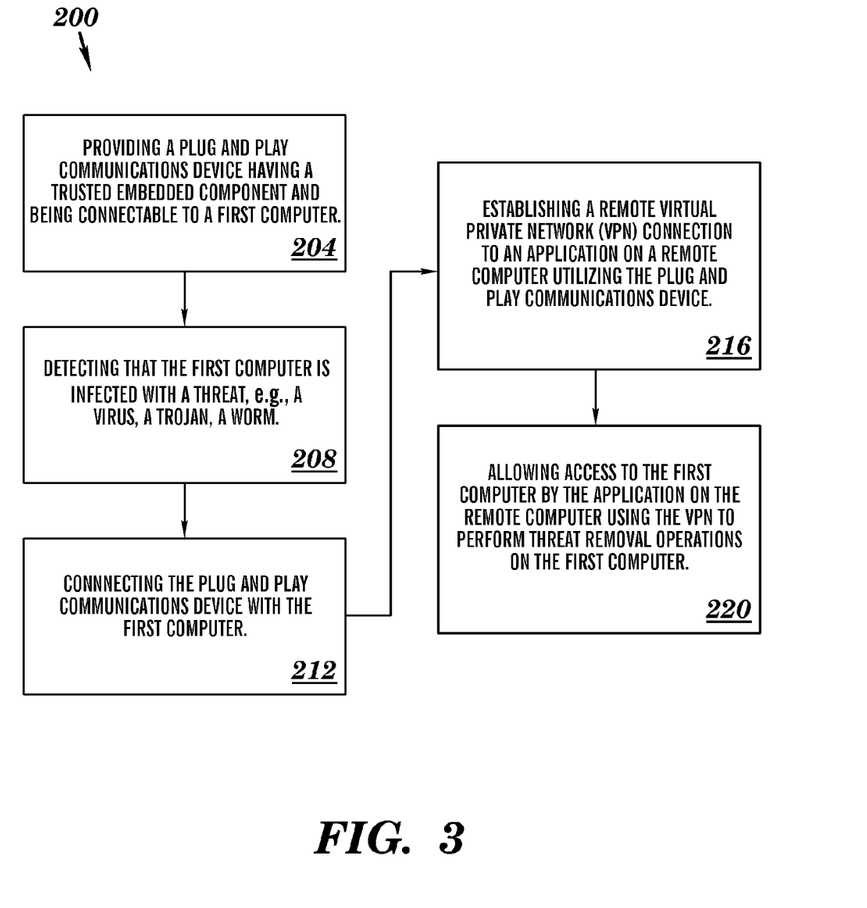
FIG. 3 is a flow chart illustrating a method for providing remote access for threat removal from a computer according to an embodiment of the disclosure.

Thereby, referring to FIG. 3, an embodiment according to the present disclosure, provides a method 200 providing remote access for threat removal to a computer system. The method 200 includes providing the plug and play communications device 20 which has a trusted embedded component/computer system 24, as in block 204. The plug and play communications device 20 is connectable to the first client computer 30. The plug and play device can include a male universal serial port (USB) device connectable via a USB connection on the first computer. The plug and play device can also include a networking card.

Detection of a threat can occur when the first computer is infected with a threat, such as, a virus, a Trojan, or a worm, as in block 208. The detection of the threat can occur by a user or a program, such as antivirus software. The plug and play communications device can be connected to the first computer, once the threat is detected, as in block 212.

The method 200 includes establishing a remote virtual private network (VPN) 40 connection to the application 132 on the remote computer 130 utilizing the plug and play communications device 20 having the trusted embedded component/computer system 24, as in block 216.

The method 200 allows access to the first client computer 30 by the application 132 on the remote computer 130 using the VPN 40 to perform threat removal operations on the first computer, as in block 220. The VPN can be wireless or wired. The first client computer 30 can be part of the first communications network 10, and the remote computer 130 can be part of an administrator network 100 which is remote from the first communications network 10.

In one embodiment according to the present disclosure, the trusted embedded component/computer system 24 can be read-only. The trusted embedded component can also be cryptographically signed to prevent tampering.

The embodiments of the present disclosure do not require the construction of a specific network architecture in advance to allow the isolation of threats when they occur, and thus the embodiments of the present disclosure do not require extensive re-architecture of a network applied proactively. Further, a software configuration on the infected computer is not relied on to isolate it or prevent the spread of the threat while the device is administered, since the presence of the threat on the client computer or device indicates that the software environment on the device is compromised and can not be trusted to perform proper quarantining.

Referring to FIG. 2, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
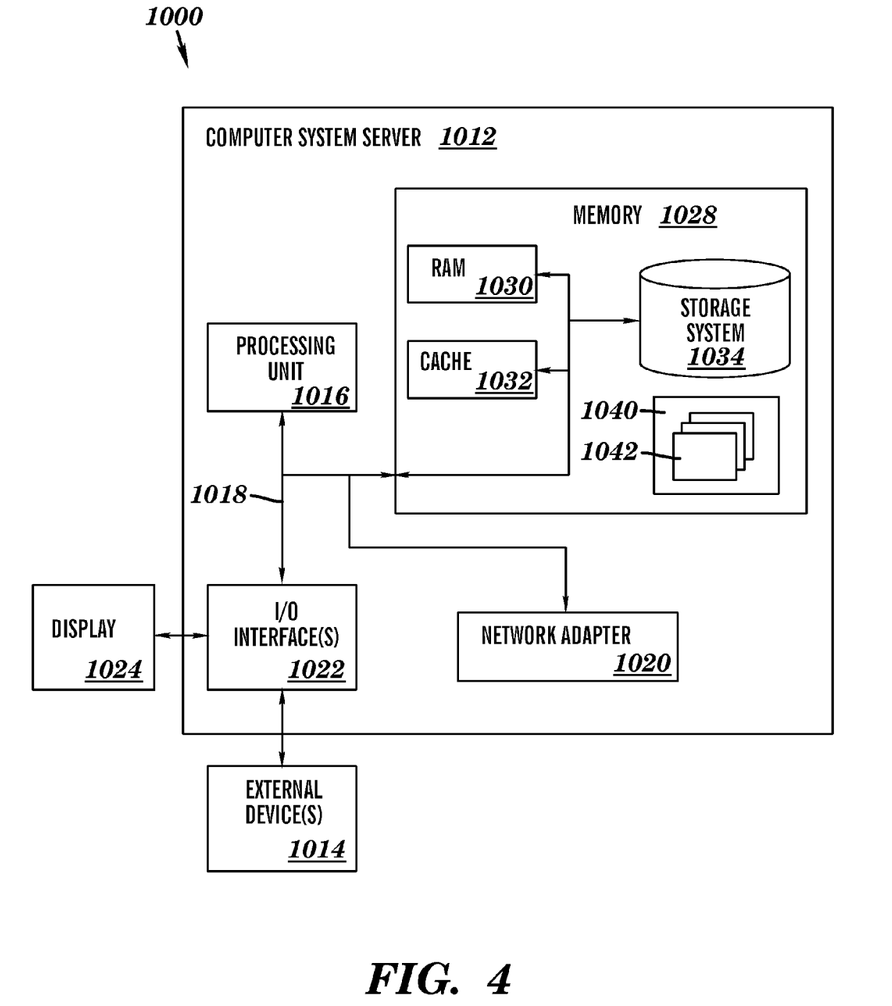
FIG. 4 is a schematic block diagram of a computer system according to an embodiment of the disclosure.

Referring now to FIG. 4, a schematic of an example of a cloud computing node is shown. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 1012 in cloud computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 5:
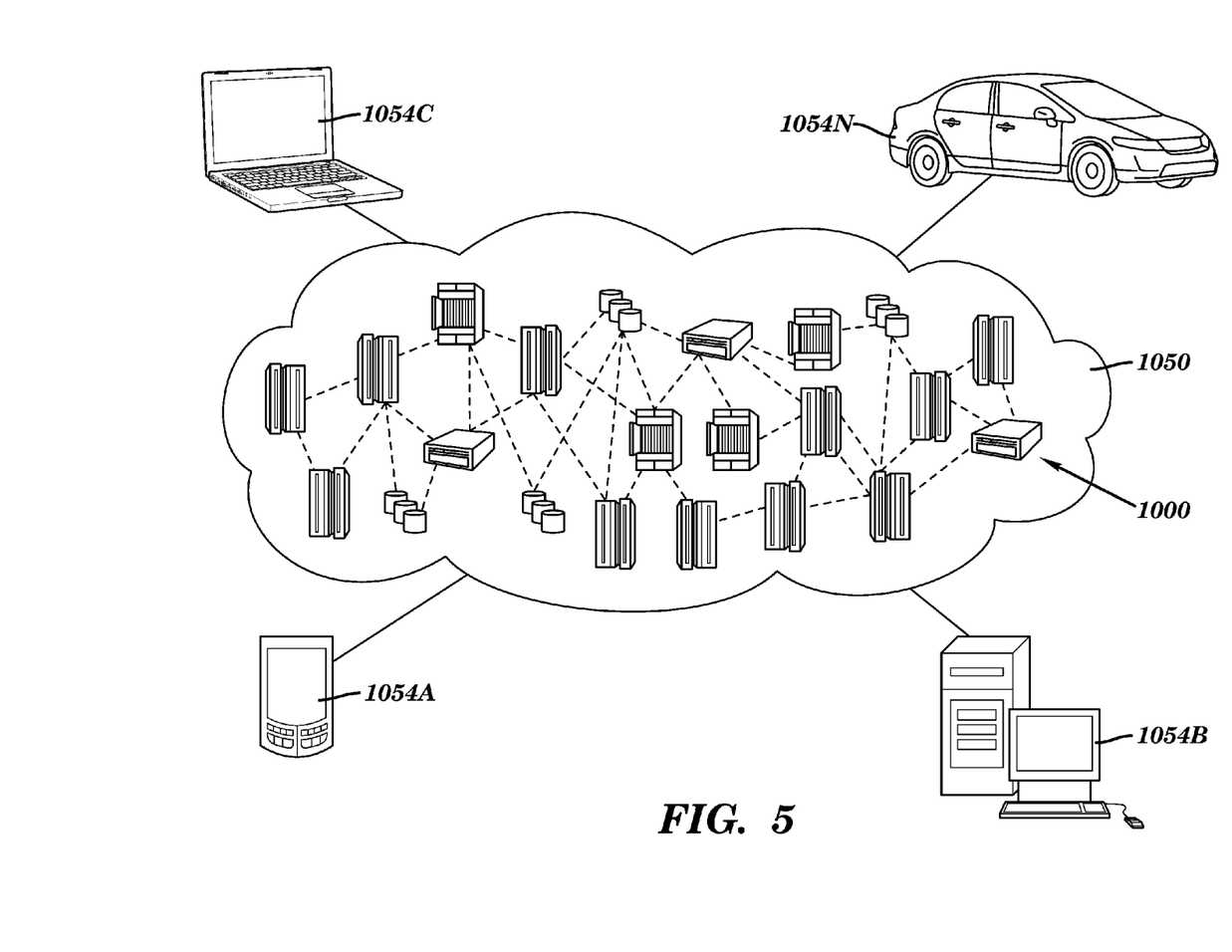
FIG. 5 is a schematic block diagram of an illustrative cloud computing environment, according to an embodiment of the disclosure.

Referring now to FIG. 5, illustrative cloud computing environment 1050 is depicted. As shown, cloud computing environment 1050 comprises one or more cloud computing nodes 1000 with which local computing devices used by cloud consumers, such as, for example, personal digital assistant (PDA) or cellular telephone 1054A, desktop computer 1054B, laptop computer 1054C, and/or automobile computer system 1054N may communicate. Multiple nodes 1000 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1000 and cloud computing environment 1050 can communicate with any type of computerized device over any type of network and/or network addressable connection (e.g., using a web browser).

Figure 6:
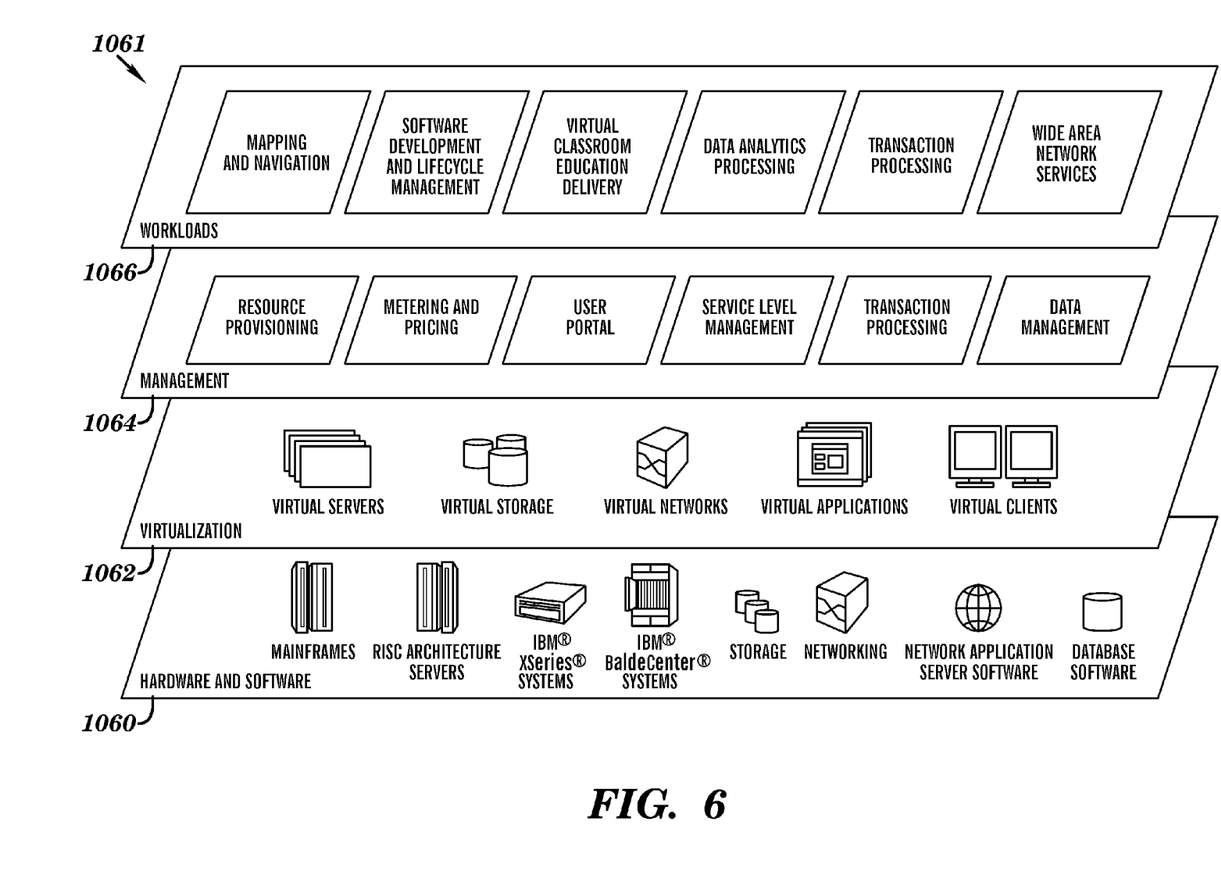
FIG. 6 is a schematic block diagram for a multi-layered functional illustration of the cloud computing environment depicted in FIG. 5, according to an embodiment of the disclosure.

Referring now to FIG. 6, a set of functional abstraction layers 1061 provided by cloud computing environment 1050 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 1060 includes hardware and software components. Examples of hardware components include: mainframes; RISC (Reduced Instruction Set Computer) architecture based servers; storage devices; networks and networking components. In some embodiments, software components include network application server software.

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and wide area network services.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method providing remote access for threat removal to a computer system, comprising:
  establishing a remote virtual private network (VPN) connection to an application on a remote computer utilizing a plug and play communications device having a trusted embedded component and being connectable to a first computer by a user;
  allowing access to the first computer by the application on the remote computer using the VPN to perform threat removal operations on the first computer;
  accepting the connection, at the remote computer using the application, only from the first computer, in response to the trusted embedded component being connected to the first computer, the first computer being part of a first communications network and the remote computer being part of second communications network remote from the first communications network;
  disabling a built-in networking interface in the first computer; and subsequently
  automatically establishing the VPN with the remote computer using the plug and play communications device connected to the first computer to enable the remote computer to perform the threat removal on the first computer.

2. The method of claim 1, wherein the trusted embedded component is read only.

3. The method of claim 1, wherein the trusted embedded component is cryptographically signed to prevent tampering.

4. The method of claim 1, wherein the plug and play communications device is connectable to a universal serial bus (USB) port.

5. The method of claim 1, wherein the threat includes one or more of a virus, a trojan, or a worm.

6. The method of claim 1, wherein the remote VPN connection is wireless or wired.

7. The method of claim 1, wherein the plug and play communications device is a networking card.

8. The method of claim 1, wherein the VPN is established using a cloud based environment.

9. The method of claim 1, further comprising:
  blocking all communications from the first computer except for allowing the VPN using the plug and play communications device having the trusted embedded component.

10. The method of claim 1, further comprising:
  establishing the VPN connection using an operating system of an embedded computer in the embedded component of the plug and play communications device, the operating system includes digitally signed configuration data for establishing the VPN connection to a VPN server.

11. A system providing remote access for threat removal to a computer system, comprising:
  a plug and play communications device including a trusted embedded component and being connectable to a first computer by a user for establishing a remote virtual private network (VPN) connection to an application on a remote computer; and the remote computer being allowed access to the first computer by the application on the remote computer to perform threat removal operations on the first computer;

the remote computer accepting the connection using the application, only from the first computer, in response to the trusted embedded component being connected to the first computer, the first computer being part of a first communications network and the remote computer being part of second communications network remote from the first communications network;

disabling a built-in networking interface in the first computer; and subsequently using the plug and play communications device connected to the first computer, automatically establishing the VPN with the remote computer to enable the remote computer to perform the threat removal on the first computer.

12. The system of claim 11, wherein the trusted embedded component is read only.

13. The system of claim 11, wherein the trusted embedded component is cryptographically signed to prevent tampering.

14. The system of claim 11, wherein the plug and play communications device is connectable to a universal serial bus (USB) port.

15. The system of claim 11, wherein the threat includes one or more of a virus, a trojan, or a worm.

16. The system of claim 11, wherein the remote VPN connection is wireless or wired.

17. The system of claim 11, wherein the plug and play communications device is a networking card.

18. The system of claim 11, wherein the VPN is established using a cloud based environment.

19. A computer program product for threat removal to a computer system, the computer program product comprising a non-transitory computer readable storage medium having program instructions embodied therewith, the program instructions executable by a computer to cause the computer to perform a method, comprising:

establishing a remote virtual private network (VPN) connection to an application on a remote computer utilizing a plug and play communications device having a trusted embedded component and being connectable to a first computer by a user;

allowing access to the first computer by the application on the remote computer using the VPN to perform threat removal operations on the first computer;

accepting the connection, at the remote computer using the application, only from the first computer, in response to the trusted embedded component being connected to the first computer, the first computer being part of a first communications network and the remote computer being part of second communications network remote from the first communications network;

disabling a built-in networking interface in the first computer; and subsequently automatically establishing the VPN with the remote computer using the plug and play communications device connected to the first computer to enable the remote computer to perform the threat removal on the first computer.

* * * * *